United States Patent Office 3,755,460
Patented Aug. 28, 1973

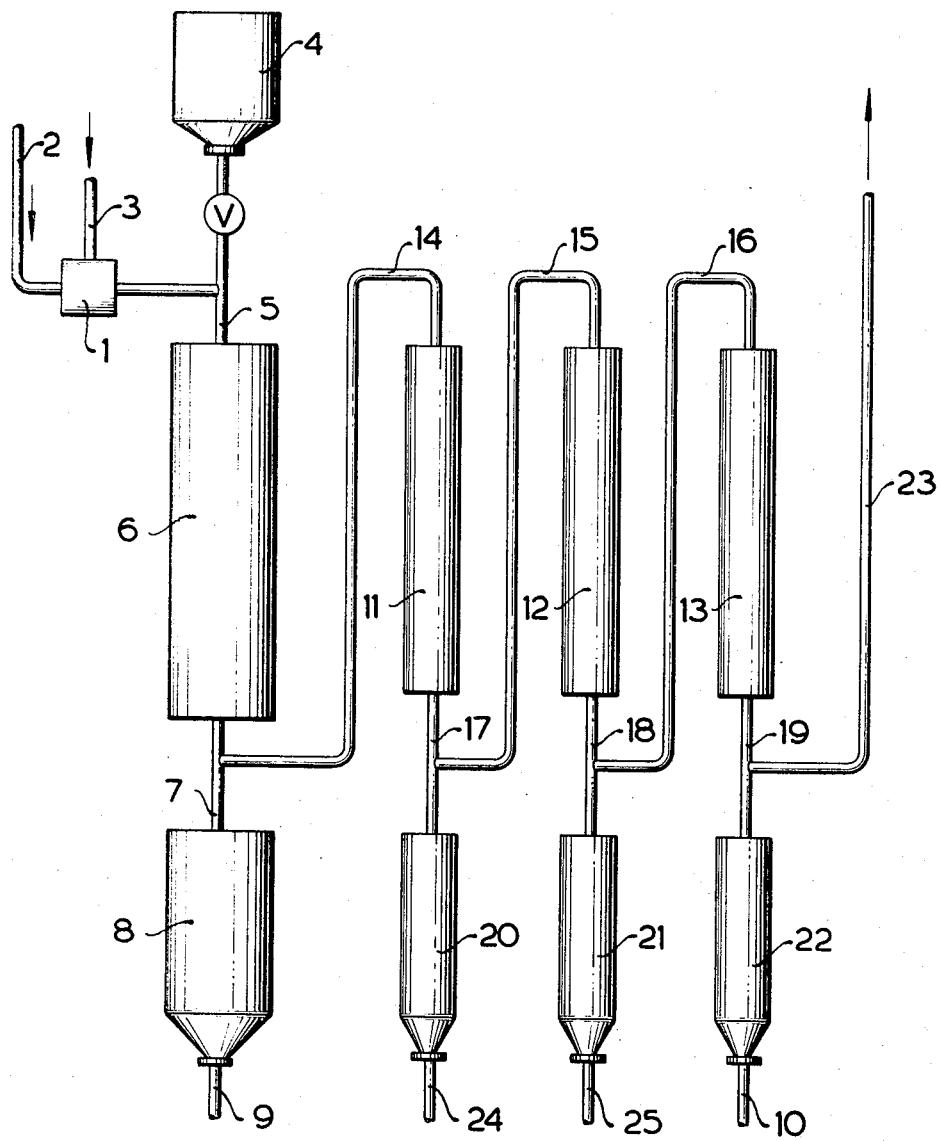

3,755,460
PRODUCTION OF TRIALKYLPHOSPHONIUM HALIDES
Horst Staendeke, Brühl, Germany, assignor to Knapsack Aktiengesellschaft, Knapsack bie Cologne, Germany
Filed Mar. 31, 1972, Ser. No. 240,033
Claims priority, application Germany, Apr. 3, 1971, P 21 16 355.3
Int. Cl. C07f 9/54
U.S. Cl. 260—606.5 F    17 Claims

ABSTRACT OF THE DISCLOSURE

Production of trialkylphosphonium halides of the general formula $$(R_3PH)X$$

in which R stands for alkyl groups having from 1 to 3 carbon atoms and X stands for a halogen atom. A vaporous or gaseous mixture of phosphorus and an alkyl halide with between 1 and 3 carbon atoms in the alkyl radical is passed by means of a carrier gas, in the absence of oxygen or air, and at a temperature between 280 and 420° C., over an active carbon catalyst, the resulting gaseous reaction mixture is subjected to fractional condensation so as to isolate monoalkylhalogenophosphine, dialkylhalogenophosphine and a two layer-forming mixture of trialkylphosphonium halide and unreacted phosphorus therefrom, and the trialkylphosphonium halide is separated.

---

The present invention relates to a process for the manufacture of trialkylphosphonium halides of the general formula $(R_3PH)X$, in which R stands for alkyl groups having from 1 to 3 carbon atoms and X stands for a halogen atom.

Trialkylphosphonium halides have been produced heretofore by the reaction of trialkylphosphines with hydrogen halides. To this end, it has been necessary first to prepare the trialkylphosphines either by a Grignard reaction in accordance with the following equations:

$$RPX_2 + 2RMgX \rightarrow R_3P + 2MgX_2$$
$$PX_3 + 3RMgX \rightarrow R_3P + MgX_2$$
$$R_2PX + RMgX \rightarrow R_3P + MgX_2$$

or from phosphides of metals Me and alkyl halides in accordance with the following equations:

$$PMe_3 + 3RX \rightarrow R_3P + 3MeX$$
$$RPMe_2 + 2RX \rightarrow R_3P + 2MeX$$
$$R_2PMe + RX \rightarrow R_3P + MeX$$

and this with the possibility of replacing the Grignard compounds by further organometallic compounds, such as lithium alkyl, sodium alkyl, potassium alkyl, aluminium trialkyl and lead tetraalkyl.

These earlier processes are, however, not fully satisfactory as they dictate the use of costly starting materials which are required to be produced in several steps.

A. W. Hoffmann (cf. Liebig, Annalen der Chemie, supplement volume 1, pages 2–7) was the first to try and describe the preparation of trialkylphosphonium halides from elementary phosphorus and ethyl iodide in the presence of zinc at temperatures between 160 and 170° C., in a bomb tube. The reaction product obtained together with a plurality of by-products was not triethylphosphonium iodide, but was a double salt of this compound with zinc iodide.

In German Pat. 1,122,522, it has been reported that hydrocarbon-substituted halogenophosphines can be made by reacting red phosphorus with a hydrocarbon halide at a temperature between 200° C. and the sublimation temperature of phosphorus, in the presence of powdered copper as a catalyst. The resulting gaseous monoalkyl- and dialkylhalogenophosphines are condensed and separated from each other by fractional distillation.

Still further, it has been reported in German published specification DOS 1,568,928 that phosphorus in gas or vapor from can be reacted with an alkyl chloride at a temperature between 300 and 400° C., for example, in the presence of an active carbon catalyst with the resultant formation—this in a manner analogous to the process described in German Pat. 1,122,522—of alkylchlorophosphines together with unreacted phosphorus.

A feature characteristic of these two last-mentioned processes resides in the fact that the formation of alkylhalogenophosphines therein could in no case be found to be accompanied by the formation of trialkylphosphonium halides. It has therefore been reasonable to believe the reaction of phosphorus with an alkyl halide in vapor phase and in contact with an active carbon catalyst, for example, to principally and exclusively produce alkylhalogenophosphines. We have now unexpectedly discovered, however, that trialkylphosphonium halides may well be produced from elementary phosphorus and alkyl halides in the presence of an active carbon catalyst, under certain conditions.

The process of the present invention for the manufacture of trialkylphosphonum halides of the general formula $$(R_3PH)X$$

in which R stands for alkyl groups having from 1 to 3 carbon atoms and X stands for a halogen atom, comprises more particularly flowing a vaporous or gaseous mixture of phosphorus and an alkyl halide with between 1 and 3 carbon atoms in the alkyl radical by means of a carrier gas, in the absence of oxygen or air, and at a temperature between 280 and 420° C., over an active carbon catalyst, subjecting the resulting gaseous reaction mixture to fractional condensation so as to isolate monoalkylhalogenophosphine, dialkylhalogenophosphine and a two layer-forming mixture of trialkylphosphonium halide and unreacted phosphorus therefrom, separating the trialkylphosphonium halide and purifying it by heating to temperatures higher than the boiling point of the alkylhalogenophosphines.

A preferred feature of the process of the present invention comprises using as starting materials yellow phosphorus and alkyl halides having chlorine or bromine as the halogen atom therein, for example methyl chloride, methyl bromide or ethyl chloride. In order to enable the starting materials transformed into gas or vapor form to be passed at a satisfactory speed over the catalyst, it is good practice to use as the carrier gas a hydrohalic acid in which chlorine or bromine is the halogen, or hydrogen, nitrogen, argon, or a suitable mixture thereof.

The gaseous starting materials of alkyl halide and phosphorus in vapor form which are passed over the catalyst, should generally be used in a molar ratio between 0.5 and 3. The gas mixture including the carrier gas, which is passed over the catalyst, may contain up to 80% by volume, preferably between 30 and 50% by volume, of carrier gas. A gas mixture consisting approximately of 30% by volume of alkyl halide, approximately 20% by volume of phosphorus in vapor form and approximately 50% by volume of carrier gas is particularly useful for practical operation.

Use should be made of a reaction temperature between about 340 and 360° C. so as to avoid partial decomposition of the resulting reaction product, and the reaction mixture should be contacted with the catalyst for a period between about 0.1 second and 30 minutes, preferably between about 10 seconds and 5 minutes, so as to ensure an optimum conversion rate for the starting materials in contact with the catalyst.

The gaseous reaction product which comprises several components is generally worked up by subjecting the individual components of the mixture to fractional condensation. Trialkylphosphonium halide, for example, is precipitated from the reaction mixture at a temperature between 60 and 150° C. The selective condensation of trialkylphosphonium halide is effected by cooling the mixture down to a temperature of approximately 100° C. In order to effect the condensation of the further components of the mixture, such as monoalkylhalogenophosphine, dialkylhalogenophosphine and unreacted alkyl halide, it is necessary to subject the residual gas, freed earlier from trialkylphosphonium halide, to stagewise condensation at a temperature lower than 60° C., the alkyl halide, which is recovered, being used again for reaction with phosphorus.

A still further preferred feature of the process of the present invention comprises drying the catalyst at a temperature between about 350 and 360° C., preferably in the presence of a hydrogen halide, prior to using it. The use of a hydrogen halide as the carrier gas and the pre-treatment of the catalyst therewith at elevated temperature has beneficial effects upon the yield of trialkylphosphonium halide. It is therefore justified to believe that the hydrogen halide carrier gas does not act as an inert gas, but does favorably influence the course of the reaction.

The process of the present invention, which is the first to permit the manufacture of trialkylphosphonium halides from elementary phosphorus and an alkyl halide as the starting materials, is a very desirable step forward in the art. Despite the relatively limited yields of trialkylphosphonium halides, the present process must be regarded as a commercially attractive procedure, especially in those cases in which inexpensive yellow phosphorus is substituted for more costly red phosphorus. This in view of the fact that phosphonium halide is obtained together with mono- and di-alkylhalogenophosphines, which are also valuable reaction products of commercial interest, for example, in the production of biocides. As compared with earlier methods, the present process is an uncomplicated procedure which can more particularly be carried out continuously.

Trialkylphosphonium halides find widespread uses as catalysts, for example in the form of complex compounds with transition metal compounds in the cyclization of ethylene and acetylene compounds, in the polymerization of aldehydes, ethylene and acetylene derivatives, in the hydroformylation, and in the dehydrohalogenation of halogenated hydrocarbons.

Continuous operation by the process of the present invention will now be described with reference to the accompanying flow scheme. Needless to say the invention is not limited thereto.

A mixing device 1 is used to prepare a mixture of carrier gas and alkyl halide therein, the mixing components being introduced into mixing device 1 through lines 2 and 3. The mixture so made is delivered together with phosphorus, which is stored in a heated reservoir 4, to a heated tubular reactor 6, through line 5. Following evaporation of the phosphorus, the mixture undergoes reaction at temperatures between 280 and 420° C. in contact with the active carbon catalyst. The gaseous reaction mixture coming from tubular reactor 6 is conveyed through line 7 to steam-heated condenser 8, in which trialkylphosphonium halide is condensed together with unreacted phosphorus. The resulting condensate is found to form two layers, namely an upper layer of phosphonium halide and a lower layer of phosphorus. This enables the two components to be recovered by phase separation and to be removed through line 9. Fractions which remain uncondensed in condenser 8 are conveyed through feed lines 14, 15 and 16 to condensers 11, 12 and 13 placed one downstream of the other, liquefied therein and the resulting condensates are delivered to collectors 20, 21 and 22, respectively, which communicate with condensers 11, 12 and 13 through junction lines 17, 18 and 19. Collectors 20 and 21 receive monoalkylhalogenophosphine and dialkylhalogenophosphine, respectively, whereas collector 22 receives unreacted alkyl halide. Uncondensed gaseous fractions of the reaction mixture, such as carrier gas and hydrogen—this latter originates from decomposition and secondary reactions—and lower olefins are removed through off-gas line 23. The products obtained in collectors 20, 21 and 22 are removed through lines 24, 25 and 10.

EXAMPLE

Nitrogen was introduced into an experimental apparatus to expel air therefrom and produce trimethylphosphonium chloride therein. Following this, the 2,000 grams of active carbon placed in tubular reactor 6 were dried at a temperature between 350 and 360° C. After the pre-treatment of the catalyst was terminated, 120 liters/hr. of hydrogen chloride gas were mixed with 70 liters/hr. of methyl chloride in mixer 1, and the resulting mixture was passed through tubular reactor 6, which had a temperature of 360° C. 160 grams/hr. of yellow phosphorus coming from reservoir 4 were simultaneously introduced into tubular reactor 6 and evaporated therein. The resulting phosphorus vapors in admixture with the hydrogen chloride and methyl chloride were passed over the active carbon catalyst and underwent reaction. The resulting hot reaction gases were cooled in steam-heated condenser 8 and trimethylphosphonium chloride together with unreacted phosphorus were condensed therein. Fractions of the reaction gas which remained uncondensed in condenser 8 were delivered to condensers 11, 12 and 13 and subjected to stagewise cooling therein down to temperatures of 20° C., −40° C. and −80° C., respectively, and the resulting condensates were collected in collectors 20, 21 and 22, respectively. The experiment was arrested after 80 hours of operation. The products obtained were taken from the individual collectors and the yield was determined.

Condenser 8 contained 1.2 kg. of crude trimethylphosphonium chloride. Collectors 20 and 21 were found to have 9 kg. of methyldichlorophosphine and 4.5 kg. of dimethylchlorophosphine, respectively, therein. Collector 22 contained 2.6 kg. of unreacted methyl chloride.

The crude trimethylphosphonium chloride was purified by heating it to a temperature of 150° C. and 300 grams of a mixture of methyldichlorophosphine and dimethylchlorophosphine were obtained as the distillate. Purified trimethylphosphonium chloride was obtained in a yield of 12%, based on the methyl chloride which underwent reaction.

The methylchlorophosphines obtained as further reaction products were obtained in a yield of 73%, equally based on the methyl chloride which underwent reaction.

What is claimed is:

1. A process for the manufacture of trialkylphosphonium halides of the general formula

$$(R_3PH)X$$

in which R stands for alkyl groups having from 1 to 3 carbon atoms and X stands for a halogen atom, which comprises flowing a vaporous or gaseous mixture of phosphorus and an alkyl halide with between 1 and 3 carbon atoms in the alkyl radical by means of a carrier gas, in the absence of oxygen or air, and at a temperature between 280 and 420° C., over an active carbon catalyst, subjecting the resulting gaseous reaction mixture to fractional condensation so as to isolate monoalkylhalogenophosphine, dialkylhalogenophosphine and a two layer-forming mixture of trialkylphosphonium halide and unreacted phosphorus therefrom, separating the trialkylphosphonium halide and purifying it by heating to temperatures higher than the boiling point of the alkylhalogenophosphines.

2. The process as claimed in claim 1, wherein yellow phosphorus is used.

3. The process as claimed in claim 1, wherein the halogen atom is chlorine or bromine.

4. The process as claimed in claim 1, wherein the alkyl halide is methyl chloride, methyl bromide or ethyl chloride.

5. The process as claimed in claim 1, wherein the carrier gas is a hydrogen halide, of which the halogen atom is chlorine or bromine, or hydrogen, nitrogen, argon or a suitable mixture thereof.

6. The process as claimed in claim 1, wherein the gaseous mixture of alkyl halide and phosphorus in vapor form passed over the catalyst contains the alkyl halide and the phosphorus in a molar ratio between 0.5 and 3.

7. The process as claimed in claim 1, wherein the gaseous or vaporous mixture of phosphorus, alkyl halide and carrier gas contains up to 80% by volume of carrier gas.

8. The process as claimed in claim 7, wherein the gaseous or vaporous mixture contains between 30 and 50% by volume of carrier gas.

9. The process as claimed in claim 7, wherein the gaseous mixture consists approximately of 30% by volume of alkyl halide, approximately 20% by volume of phosphorus in vapor form and approximately 50% by volume of carrier gas.

10. The process as claimed in claim 1, wherein the reaction temperature is between 340 and 360° C.

11. The process as claimed in claim 1, wherein the reaction mixture is contacted with the catalyst for a period between about 0.1 second and 30 minutes.

12. The process as claimed in claim 11, wherein the reaction mixture is contacted with the catalyst for a period between about 10 seconds and 5 minutes.

13. The process as claimed in claim 1, wherein the gaseous reaction mixture is subjected to condensation at a temperature between 60 and 150° C. so as to isolate trialkylphosphonium halide therefrom.

14. The process as claimed in claim 13, wherein the trialkylphosphonium halide is condensed at about 100° C.

15. The process as claimed in claim 1, wherein the gaseous reaction mixture is subjected to stagewise condensation at a temperature lower than about 60° C. so as to isolate therefrom monoalkylhalogenophosphine and dialkylhalogenophosphine formed together with the trialkylphosphonium halide, and unreacted alkyl halide, and the isolated alkyl halide is used again for reaction with phosphorus.

16. The process as claimed in claim 1, wherein the catalyst is dried at a temperature between about 350 and 360° C., prior to using it.

17. The process as claimed in claim 16, wherein the catalyst is dried at temperatures between about 350 and 360° C. in the presence of hydrohalic acid, prior to using it.

References Cited
UNITED STATES PATENTS 3,432,559   3/1969   Ludwig _____ 260—606.5 F
3,481,988   12/1969  Wunsch et al. ____ 260—606.5 P WERTEN F. W. BELLAMY, Primary Examiner U.S. Cl. X.R.
252—437